(12) United States Patent
Wu

(10) Patent No.: US 8,412,265 B2
(45) Date of Patent: Apr. 2, 2013

(54) ELECTRONIC APPARATUS WITH PHOTOGRAPHING FUNCTIONS

(75) Inventor: Wen-Chin Wu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 467 days.

(21) Appl. No.: 12/453,457

(22) Filed: May 12, 2009

(65) Prior Publication Data
US 2010/0087226 A1    Apr. 8, 2010

(30) Foreign Application Priority Data
Oct. 7, 2008    (TW) .............................. 97138613 A

(51) Int. Cl.
*H04M 1/00*    (2006.01)

(52) U.S. Cl. .................. 455/556.1; 455/575.4; 396/326; 396/327; 348/49

(58) Field of Classification Search ............... 455/556.1, 455/575.4; 348/49, 375, 218.1, 36, E5.024; 382/154; 345/420; 396/326, 327
See application file for complete search history.

(56) References Cited

U.S. PATENT DOCUMENTS

| 4,687,310 | A | * | 8/1987 | Cuvillier | 396/327 |
| 5,805,947 | A | * | 9/1998 | Miyamoto et al. | 396/448 |
| 2008/0051164 | A1 | * | 2/2008 | Joo et al. | 455/575.4 |
| 2008/0131107 | A1 | * | 6/2008 | Ueno | 396/50 |
| 2008/0225129 | A1 | * | 9/2008 | Viinikanoja et al. | 348/218.1 |

* cited by examiner

*Primary Examiner* — Charles Appiah
*Assistant Examiner* — Alexander Yi
(74) *Attorney, Agent, or Firm* — Bacon & Thomas, PLLC

(57) ABSTRACT

An electronic apparatus with photographing function is disclosed. The electronic apparatus comprises a main body and a sliding structure. The main body comprises a lens module and a controlling module. The sliding structure is movably connected to the main body and comprises an optical module. The optical module comprises two light-incidence openings, and the distance between the two light-incidence openings is substantially equal to the average distance between a human's eyes. The lens module is capable of obtaining two images via the optical module through movement of the sliding structure. The two images may be processed via the controlling module to form a 3D image.

12 Claims, 5 Drawing Sheets

ELECTRONIC APPARATUS WITH PHOTOGRAPHING FUNCTIONS

BACKGROUND OF THE INVENTION

1. Field of the Invention

The present invention relates to an electronic apparatus with a photographing function, and, more particularly, to an electronic apparatus with a photographing function which is capable of generating images in 3D format.

2. Description of the Related Art

Recently, with improvements in technology, typical 2D plane display images do not meet demands for high quality visual entertainment; therefore, 3D format images have been developed. For mobile phone applications, the typical 2D plane display device is a well developed technology; currently, many mobile phone manufacturers are developing 3D image display devices. The primary requirement for developing a 3D display device is how to generate 3D format images on the mobile phone. A prior art mobile phone with a 3D image function has another lens module next to an original lens module on the back side of the mobile phone, and the two lens modules obtain two images with a viewing angle difference in between to generate and display a 3D image. However, since most of the mobile phones have a very limited volume to maintain the convenience of portability, the two lens modules of the prior art mobile phone might be disposed too close to each other and obtain two images with an insufficient difference in viewing angle, which affects the quality and effect of the generated 3D image. Furthermore, the additional lens module reduces available space in the mobile phone and also increases the manufacturing cost of the mobile phone.

Therefore, it is desirable to provide an electronic apparatus with a photographing function which is capable of generating images in a 3D format to mitigate and/or obviate the aforementioned problems.

SUMMARY OF THE INVENTION

A main objective of the present invention is to provide an electronic apparatus with a photographing function which is capable of generating images in a 3D format with an optical module.

In order to achieve the above mentioned objective, the electronic apparatus with photographing function of the present invention comprises a main body and a sliding structure. The main body comprises a lens module and a control module. The sliding structure is movably connected to the main body and comprises an optical module. The optical module comprises two light-incidence openings, and the distance between the two light-incidence openings is substantially equal to the average distance between a human's eyes. By moving the sliding structure, the lens module is capable of obtaining two images via the optical module. The two images may be processed via the controlling module to form a 3D image.

With this design, the electronic apparatus with photographing function of the present invention uses the lens module and the optical module of the sliding structure to generate 3D format images, and the photographing mode of the electronic apparatus is capable of being switched by moving the sliding structure to improve the convenience and functionality of the electronic apparatus. Furthermore, with the asymmetric design of the optical module, the viewing angle between the two obtained images can be increased to improve the effect of the 3D format image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
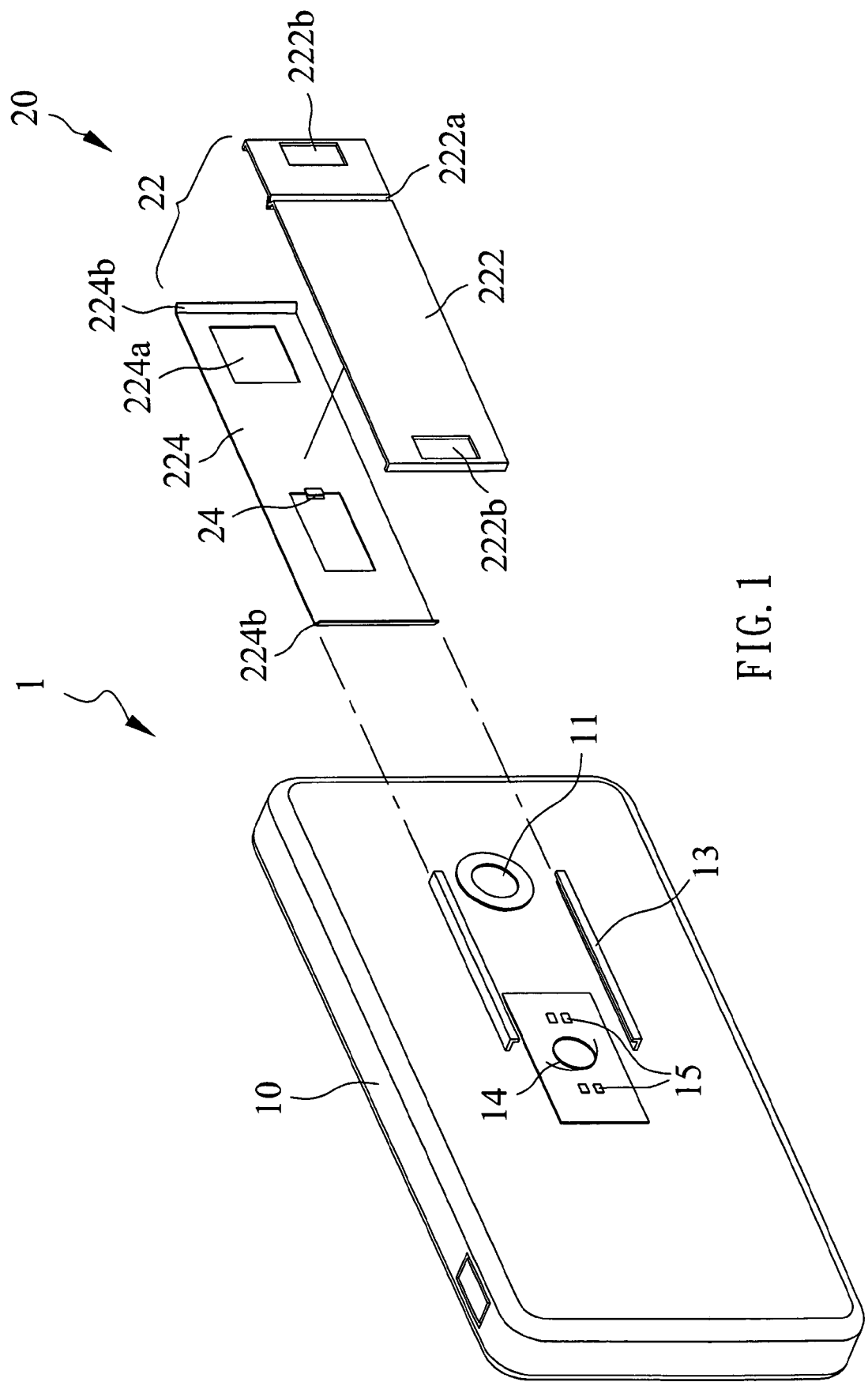
FIG. 1 is an exploded structure drawing of an electronic apparatus with photographing function of the present invention.
Figure 2:
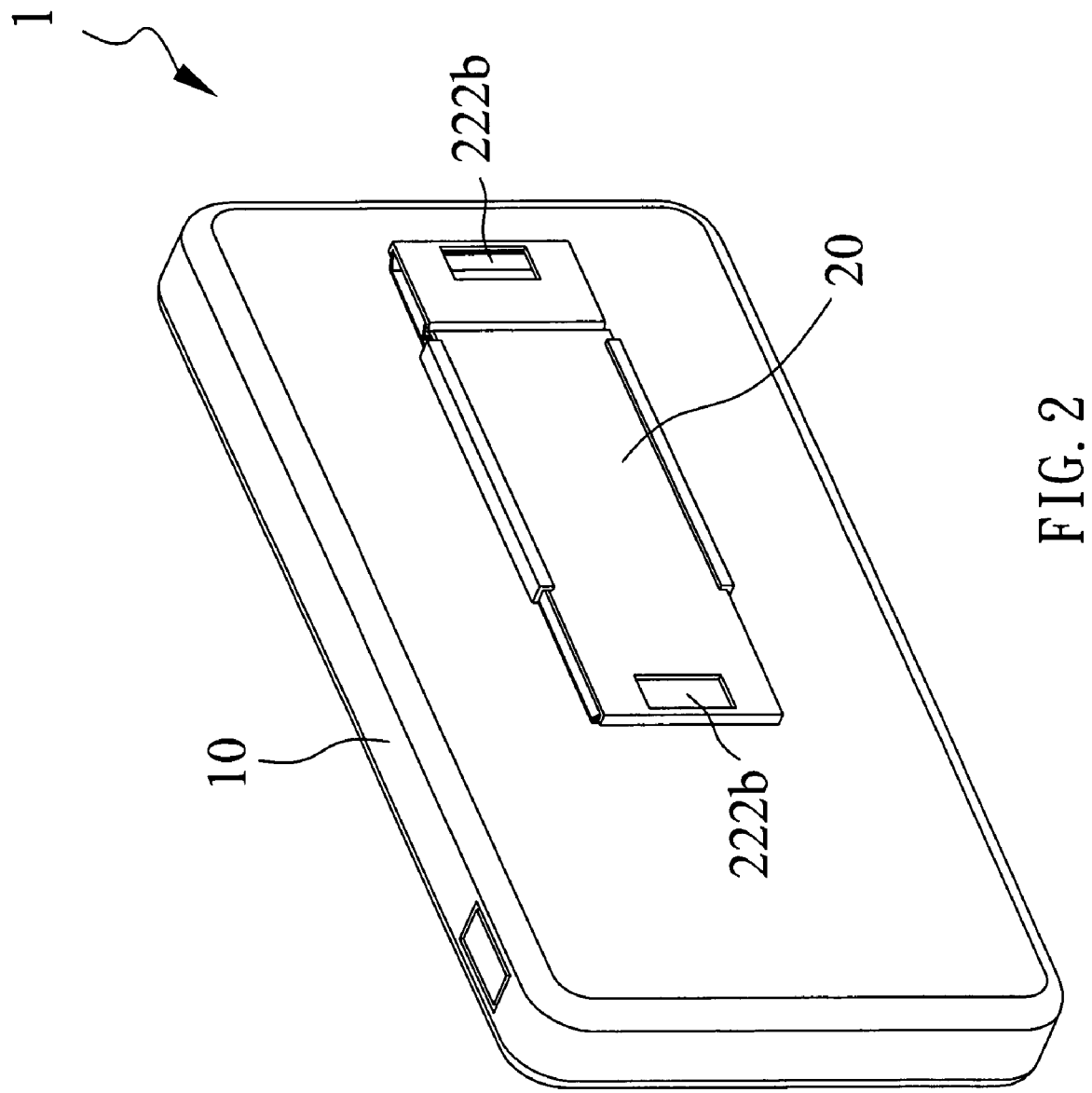
FIG. 2 is a perspective drawing of the electronic apparatus with photographing function of the present invention.

Please refer to FIG. 1 and FIG. 2. FIG. 1 is an exploded structural drawing of an electronic apparatus with photographing function of the present invention. FIG. 2 is a perspective drawing of the electronic apparatus with photographing function of the present invention. As shown in FIG. 1 and FIG. 2, an electronic apparatus 1 comprises a main body 10 and a sliding structure 20. The main body 10 comprises a lens module 11, a control module 12, and a track structure 13. The track structure 13 enables the sliding structure 20 to be moveably engaged with the main body 10, and the sliding structure 20 comprises an optical module 22. The optical module 22 comprises an upper cover 222 and a lower cover 224, and the upper cover 222 further comprises an indentation 222a and two light-incidence openings 222b. Furthermore, a light reflecting element (not shown) is disposed on the inside surface of the indentation 222a, and the two light-incidence openings 222b are located at the two ends of the upper cover 222. The distance between the two light-incidence openings 222b is substantially equal to the average distance between a human's eyes.

The lower cover 224 comprises a lens hole 224a and two inclines 224b. The lens hole 224a corresponds to the indentation 222a of the upper cover 222 such that light can be reflected into the lens module 11. Two inclines 224b are located at two ends of the lower cover 224. Each incline 224b corresponds to each light-incidence opening 222b of the upper cover 222, and a light reflecting element (not shown) is disposed on the surface of each incline 224b. When the sliding structure 20 is moved to a predetermined position, the lens hole 224a is aligned with the lens module 11 such that the lens module 11 is exposed. Then outside light enters through the two light-incidence openings 222 into the optical module 22 and is guided to the lens module 11 such that the lens module 11 can obtain two images. There is a viewing angle difference between the two images, and the distance between the two light-incidence openings 222b is substantially equal to the average distance between a human's eyes, so the two images captured are similar to the images captured the user's eyes. Afterward, the control module 12 processes the two images obtained to form a 3D format image.

In order to increase the viewing angle difference between the two images to improve the effect of the 3D format image, in this embodiment, the optical module 22 has an asymmetric design. The indentation 222a, which can reflect the light to the lens module 11, is located away from the center of the upper cover 222 to form an asymmetric light reflection path. However, the indentation 222a can also be located at other positions on the upper cover 222 for different type of electronic apparatus.

Moreover, the sliding structure 20 of the electronic apparatus 1 with photographing function further comprises a sensing module 24. The sensing module 24 is disposed on the lower cover 224 and interacts with each sensing element 15 disposed on the main body 10. When the sliding structure 20 is moved, the sensing module 24 can interact with each sensing element 15, and the photographing mode of the electronic apparatus 1 can be switched. In this embodiment, the sensing module 24 is a metal sheet, and the sensing element 15 can be a metal contact point. When the sliding structure 20 is moved, the metal sheet touches the metal contact point to form an electrical conduction that switches the photographing mode of the electronic apparatus 1. In this embodiment, the sensing module 24 and each sensing element 15 utilize the electric conduction touch sensing method; however, other sensing methods such as a magnetic induction no-touch sensing method or a light sensing method can also be applied in the present invention. The main body 10 of the electronic apparatus 1 with photographing function of the present invention further comprises an elastic element 14. The elastic element 14 connects to the main body 10 and the sliding structure 20, and is used for assisting the sliding structure 20 to move to a predetermined position. The following description explains the different operation modes with drawings.

Figure 3:
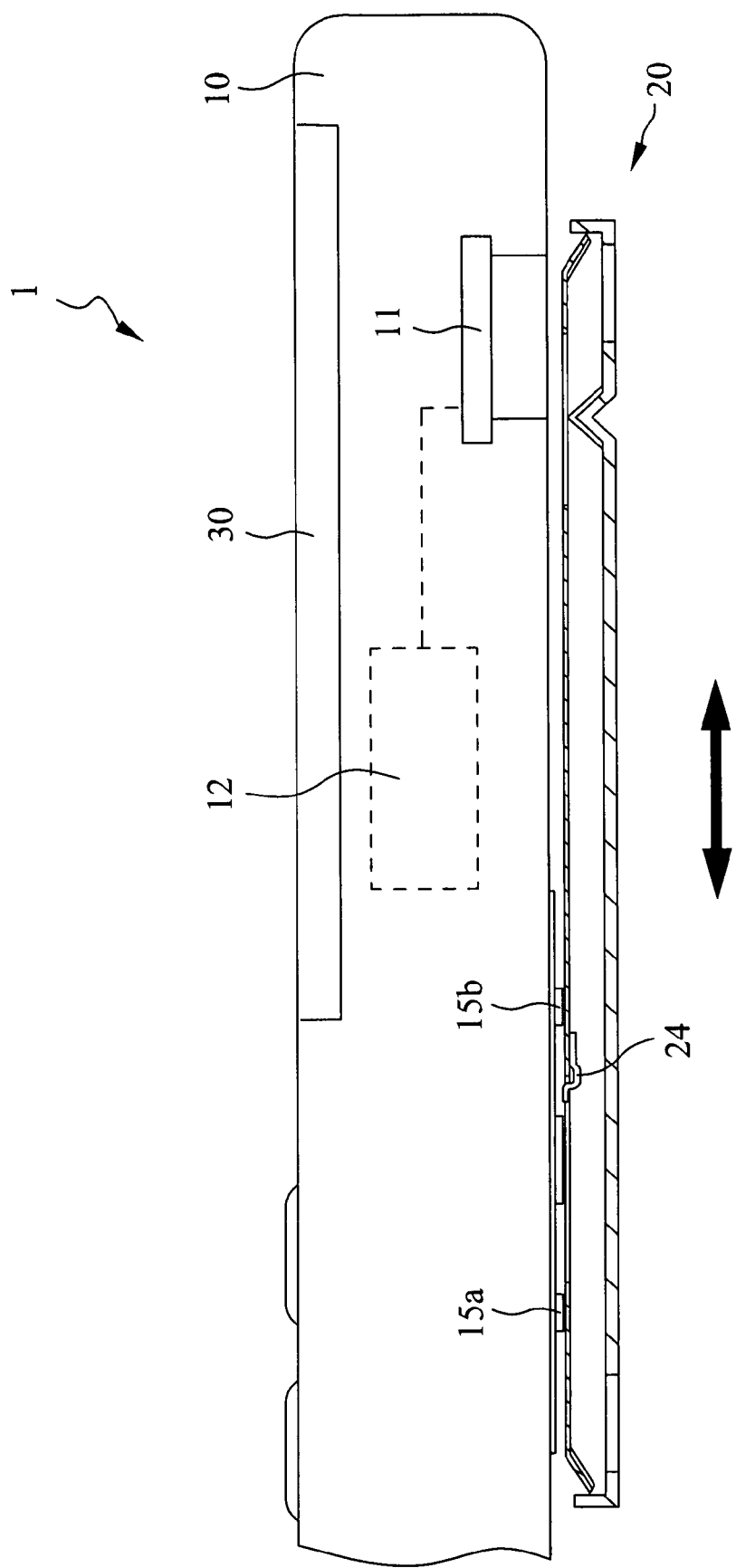
FIG. 3 is a schematic drawing of the electronic apparatus with photographing function of the present invention when the photographing function is turned off.

Please refer to FIG. 3. FIG. 3 is a schematic drawing of the electronic apparatus with photographing function of the present invention when the photographing function is turned off. When the sensing module 24 of the sliding structure 20 is not interacting with the first sensing element 15a or the second sensing element 15b of the main body 10, the photographing function of the electronic apparatus 1 is turned off, and the electronic apparatus 1 stops supplying power to the control module 12. Meanwhile, the sliding structure 20 covers and protects the lens module 11 to prevent damage to the lens module 11.

Figure 4:
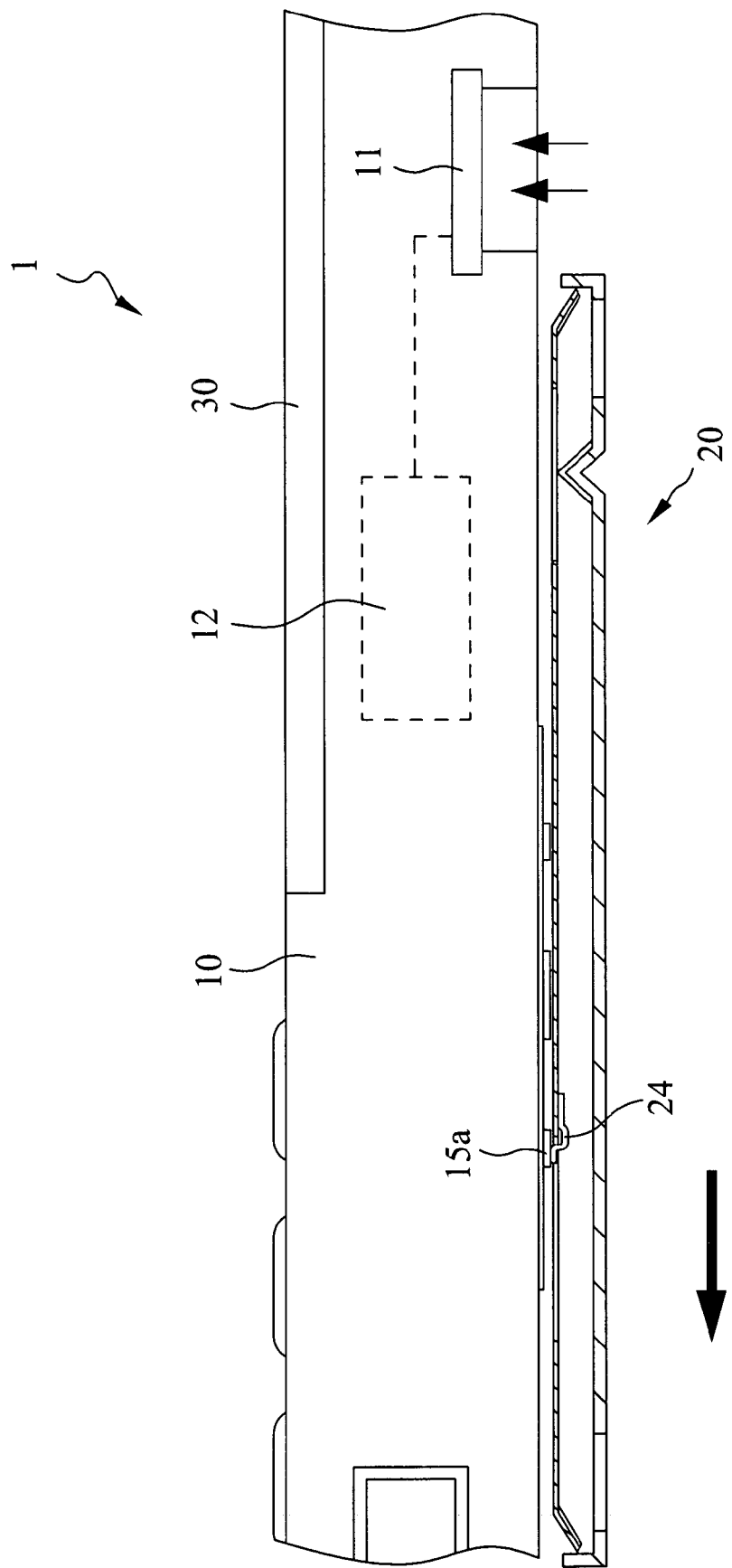
FIG. 4 is a schematic drawing of the electronic apparatus with photographing function of the present invention while in the regular photographing mode.

Please refer to FIG. 4. FIG. 4 is a schematic drawing of the electronic apparatus with photographing function of the present invention while in the regular photographing mode. As shown in FIG. 4, the sliding structure 20 can move in the direction of the arrow to increase its distance from the lens module 11 until it reaches a predetermined position. At this predetermined position, the sensing module 24 and the first sensing element 15a of the main body 10 interact with each other, and a signal is sent to the control module 12 so that the electronic apparatus 1 enters into the regular photographing mode. At this time, the lens module 11 is exposed, and outside light can directly enter into the lens module 11 to enable the lens module 11 to capture regular images.

Figure 5:
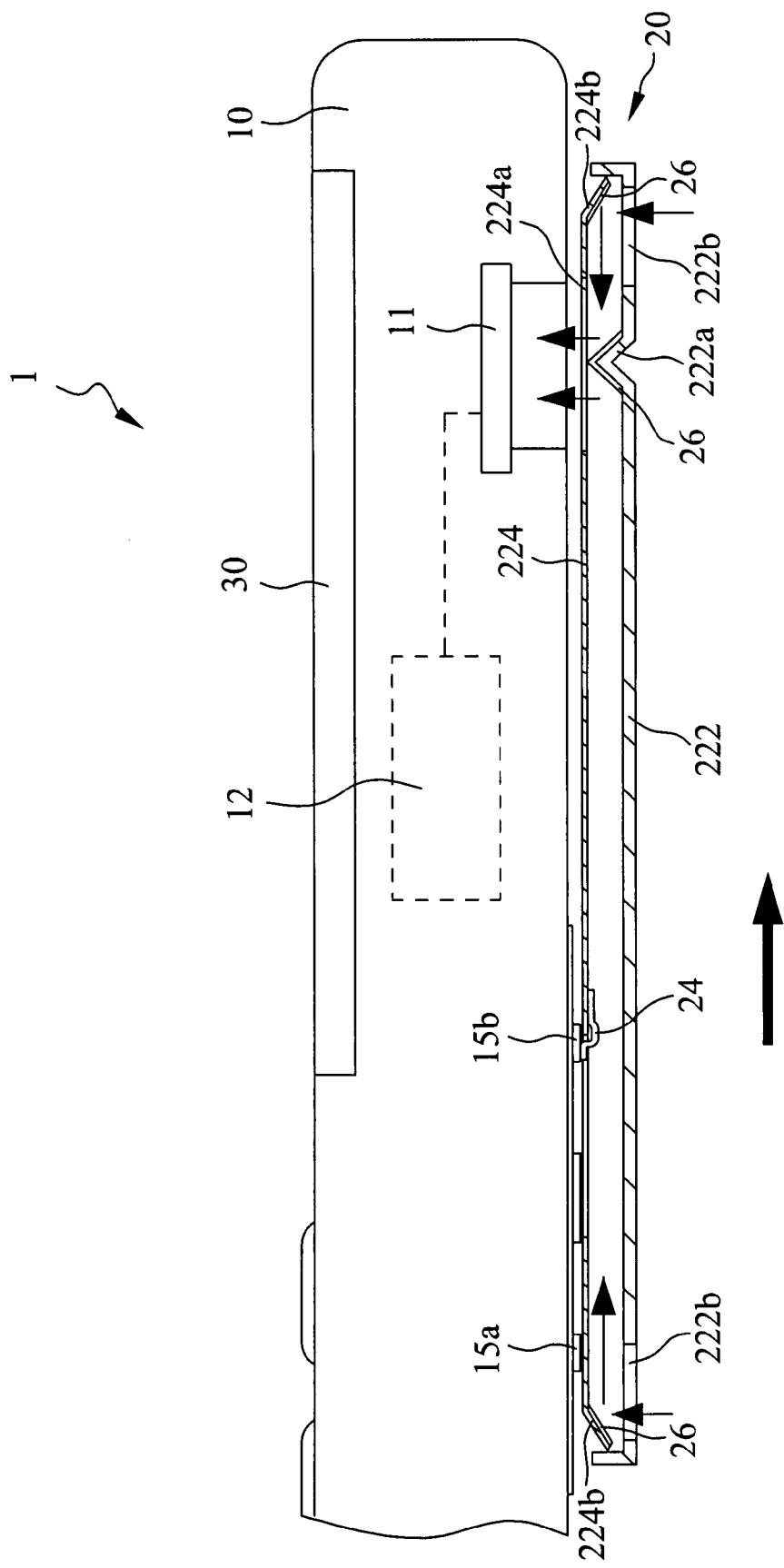
FIG. 5 is a schematic drawing of the electronic apparatus with photographing function of the present invention while in the 3D photographing mode.

Please refer to FIG. 5. FIG. 5 is a schematic drawing of the electronic apparatus with photographing function of the present invention while in a 3D photographing mode. When the sliding structure 20 moves along another direction until it reaches another predetermined position, the sensing module 24 and the second sensing element 15b of the main body 10 interact with each other, and a signal is sent to the control module 12 so that the electronic apparatus 1 enters into the 3D photographing mode. At this time, the lens hole 224a of the lower cover 224 is aligned with the lens module 11. The lens module 11 is exposed and faces the indentation 222a of the upper cover 222. The light reflecting elements 26 are disposed on the two inclines 224b of the lower cover 224 and the indentation 222a of the upper cover 222. When light passes through the two light-incidence openings 222b into the optical module 22, the light is reflected into the lens module 11 by the inclines 224b and the indentation 222a, so the lens module 11 obtains two images with a difference in viewing angle. These two images are processed by the control module 12 and thus transformed into a 3D format image. In this embodiment, the light reflecting element 26 is an electroplated layer, but other equivalent elements, such as reflecting mirrors, can also be utilized for the present invention.

In addition, the electronic apparatus 1 with photographing function of the present invention further comprises a display device disposed on the main body 10, and the display device is able to display the 3D format image formed by the control module 10. The electronic apparatus 1 with photographing function can be a mobile phone or other equivalent electronic apparatus, such as a PDA, GPS or digital camera.

Although the present invention has been explained in relation to its preferred embodiment, it is to be understood that many other possible modifications and variations can be made without departing from the spirit and scope of the invention as hereinafter claimed.

What is claimed is:

1. An electronic apparatus comprising a mobile phone with photographing function comprising: a main body comprising only one lens module and a control module, the lens module being immovable relative to the main body; and a sliding cover movably connected to the main body, the sliding cover comprising an optical module and sliding relative to the lens module; the optical module comprising an upper cover and a lower cover, the upper cover comprising two light-incidence openings one at each end and an indentation disposed between the two light-incidence openings and closer to one of the two light-incidence openings, the lower cover comprising two inclines one at each end, each incline corresponding to each light-incidence opening of the upper cover, wherein light reflecting elements are disposed on inside surface of the indentation and the surface of each incline for reflecting the incident light from the two light-incidence openings to the lens module, and the distance between the two light-incidence openings is substantially equal to the average distance between a human's eyes; the lens module is capable of obtaining two images via the optical module through movement of the sliding cover, and the two images are processed via the controlling module to form a 3D image.

2. The electronic apparatus as claimed in claim 1, wherein the indentation is located away from the center of the upper cover.

3. The electronic apparatus as claimed in claim 1, wherein the two light-incidence openings are located at the two ends of the upper cover.

4. The electronic apparatus as claimed in claim 3, wherein the two inclines are located at two ends of the lower cover.

5. The electronic apparatus as claimed in claim 1, wherein the lower cover comprises a lens hole, which corresponds to the indentation of the upper cover such that light can be reflected into the lens module.

6. The electronic apparatus as claimed in claim 1, wherein the sliding cover further comprises a sensing module; the sliding cover can be moved to control the sensing module to switch the photographing mode of the electronic apparatus.

7. The electronic apparatus as claimed in claim 6, wherein the main body further comprises a first sensing element; the interaction of the sensing module and the first sensing element can switch the electronic apparatus into the regular photographing mode.

8. The electronic apparatus as claimed in claim 7, wherein the main body further comprises a second sensing element; the interaction of the sensing module and the second sensing element can switch the electronic apparatus into the 3D photographing mode.

9. The electronic apparatus as claimed in claim 1, wherein the main body further comprises a track structure such that the sliding cover is movably engaged with the main body.

10. The electronic apparatus as claimed in claim 1, wherein the main body further comprises an elastic element for assisting the sliding cover to move to a particular position.

11. The electronic apparatus as claimed in claim 1, wherein there is a difference in viewing angle between the two images.

12. The electronic apparatus as claimed in claim 1, further comprising a display device for displaying the 3D format image.

* * * * *